United States Patent
Farnsworth et al.

(10) Patent No.: US 8,150,448 B2
(45) Date of Patent: *Apr. 3, 2012

(54) METHOD AND APPARATUS FOR CALCULATING AN INITIAL TRANSMISSION POWER IN UNIVERSAL MOBILE TELECOMMUNICATIONS SYSTEM USER EQUIPMENT

(75) Inventors: Andrew John Farnsworth, Birmingham (GB); Mark Dennis Norton, Birmingham (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,215

(22) Filed: Jul. 9, 2010

(65) Prior Publication Data

US 2010/0304781 A1 Dec. 2, 2010

Related U.S. Application Data

(63) Continuation of application No. 11/267,809, filed on Nov. 4, 2005, now Pat. No. 7,783,317.

(51) Int. Cl.
*H04B 7/00* (2006.01)

(52) U.S. Cl. ............................ 455/522; 455/69; 370/318

(58) Field of Classification Search .................. 455/522, 455/69; 370/318
See application file for complete search history.

(56) References Cited

U.S. PATENT DOCUMENTS

| | | | |
|---|---|---|---|
| 6,944,456 B1 * | 9/2005 | Bhatoolaul et al. | 455/450 |
| 2004/0110521 A1 | 6/2004 | Soldani et al. | |
| 2005/0138671 A1 * | 6/2005 | Love et al. | 725/123 |

FOREIGN PATENT DOCUMENTS

WO 2004100565 A2 11/2004

OTHER PUBLICATIONS

INACON GmbH, "Preamble Initial Power," Internet Publication at http://www.inacon.com/download/stuff/extractu/mts net opti.pdf., printed on Nov. 4, 2005.

* cited by examiner

*Primary Examiner* — Nay A Maung
*Assistant Examiner* — Angelica M Perez
(74) *Attorney, Agent, or Firm* — Finnegan, Henderson, Farabow, Garrett & Dunner LLP

(57) ABSTRACT

A method and apparatus for calculating an initial transmission power in a mobile telecommunications system is disclosed, the system comprising a network of a plurality of cells and at least one user equipment device. The user equipment device receives broadcast system information, and measures a signal power. An initial transmission power is calculated in a lowest logical layer of the system defined as a protocol stack, using the received information and measured power.

14 Claims, 5 Drawing Sheets

METHOD AND APPARATUS FOR CALCULATING AN INITIAL TRANSMISSION POWER IN UNIVERSAL MOBILE TELECOMMUNICATIONS SYSTEM USER EQUIPMENT

CROSS-REFERENCE TO RELATED APPLICATION

This application is a continuation of U.S. patent application Ser. No. 11/267,809, filed Nov. 4, 2005 now U.S. Pat. No. 7,783,317, the contents of which are hereby incorporated by reference.

BACKGROUND

1. Technical Field

This application relates to UMTS (Universal Mobile Telecommunications System) in general, and in particular to a method and apparatus for calculating an initial transmission power in universal mobile telecommunications system user equipment.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node Bs. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.14.0, referred to herein as the 25.331 specification, addresses the subject of the Radio Resource Control (RRC) protocol specification. The 3GPP 25.304 specification, v.3.14.0, referred to herein as the 25.304 specification, addresses the subject of UMTS User Equipment (UE) procedures in idle mode and procedures for cell reselection in connected mode between the UMTS Terrestrial Radio Access Network (UTRAN) and the UE.

When UEs initiate uplink communication with the UTRAN, there are two common channels for transmission: RACH (Random Access Channel) and CPCH (Common Packet Channel). However, as otherwise commonly utilised in UMTS transmissions, closed loop power control can not be used since it cannot be established prior to transmission.

Clause 8.5.7 of the 25.331 standard describes an open loop power control method including calculation of PIP (preamble initial power) for such transmissions with $$PIP=IE(1)+IE(2)+IE(3)-M(1),$$

where the IEs (1-3) (information elements 1-3) are read from broadcast system information, and M(1) is measured. Considering the communication system in terms of a standard radio access protocol stack, M(1) is measured in a lowest (physical) layer, IEs (1-3) read in higher layers, M(1) sent to the higher layers where PIP is calculated, and PIP sent to L1 for use in transmission. The transmission power is then "ramped up" in steps until either a response is received, or the ramping process completes.

PIP must be calculated prior to transmission, or when any of the broadcast values change, and PIP submitted to L1.

There are proposed strategies for dealing with PIP calculation.

Other aspects and features of the present invention will become apparent to those ordinarily skilled in the art upon review of the following description of specific embodiments of an apparatus and method for calculating an initial transmission power.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for calculating an initial transmission power in universal mobile telecommunications system user equipment is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for taking measurements in a mobile telecommunications system, the system comprising a network of a plurality of cells and at least one user equipment device. The method comprises, at the user equipment, receiving broadcast system information, measuring a signal power; and in a lower physical layer L1, calculating an initial transmission power from the broadcast system information and measured signal power.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
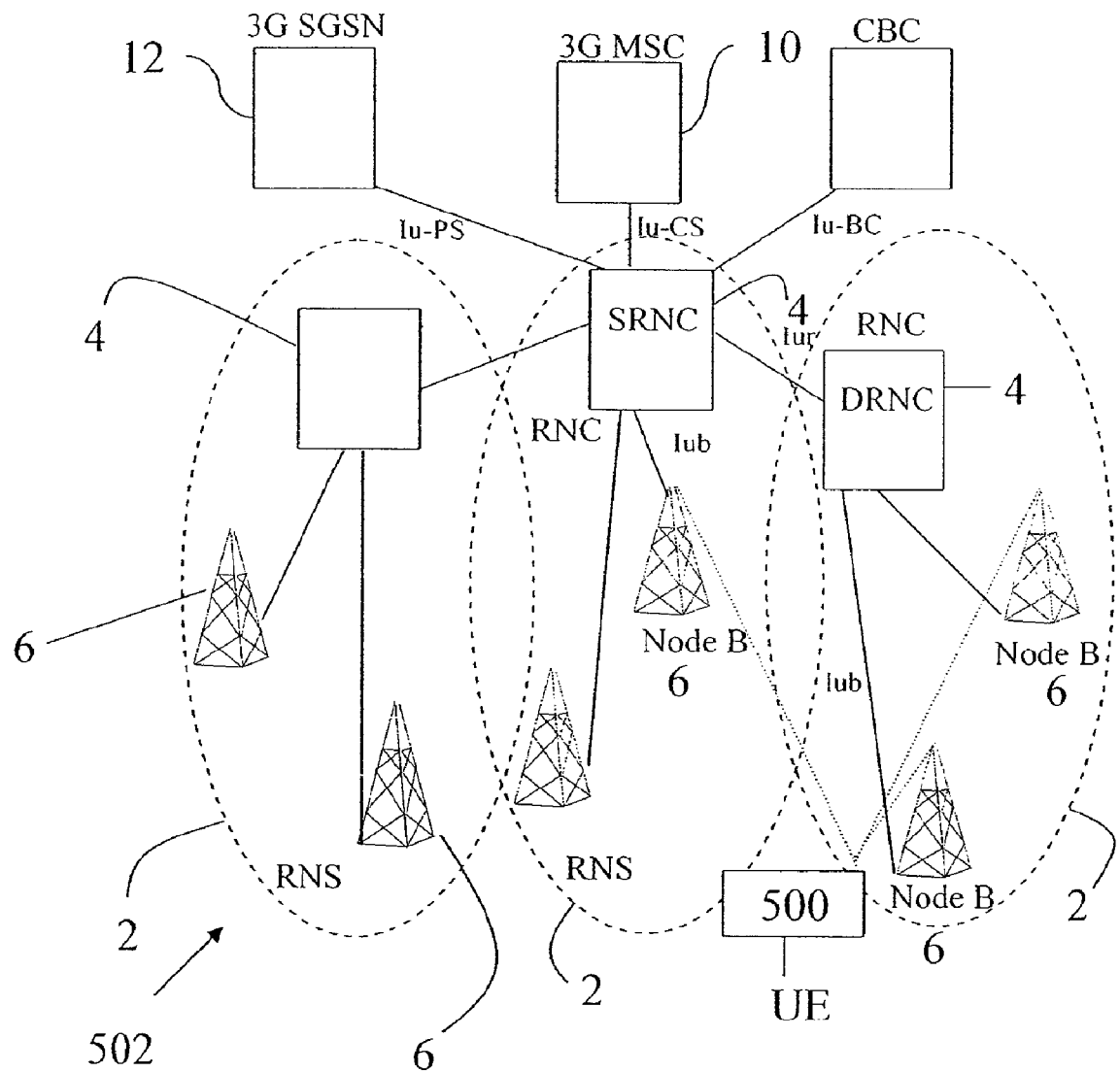
FIG. 1 is an overview of a mobile telecommunications system.

FIG. 1 shows an overview of a network and a UE device. Clearly in practice there may be many UE devices operating with the network but, for the sake of simplicity, FIG. 1 only shows a single UE device. For the purposes of illustration, FIG. 1 also shows a network having a few components. It will be clear to a person skilled in the art that in practice a network will include far more components than those shown.

FIG. 1 shows an overview of the radio access network 502 (UTRAN) used in a UMTS system. The network 502 as shown in FIG. 1 comprises three Radio Network Subsystems (RNS) 2. Each RNS has a Radio Network Controller (RNC) 4. Each RNS 2 has one or more Node Bs 6 which are similar in function to a Base Transmitter Station of a GSM radio access network. User Equipment UE 500 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also be connected to a 3G mobile switching centre 10 (3G MSC) and a 3G serving GPRS support node 12 (3G SGSN).

An RNC 4 controls one or more Node Bs. An RNC plus its Node Bs together make up an RNS 2. A Node Bs controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node Bs 6 may operate as more than one cell since it may operate at multiple frequencies and/or with multiple scrambling codes.

Figure 2:
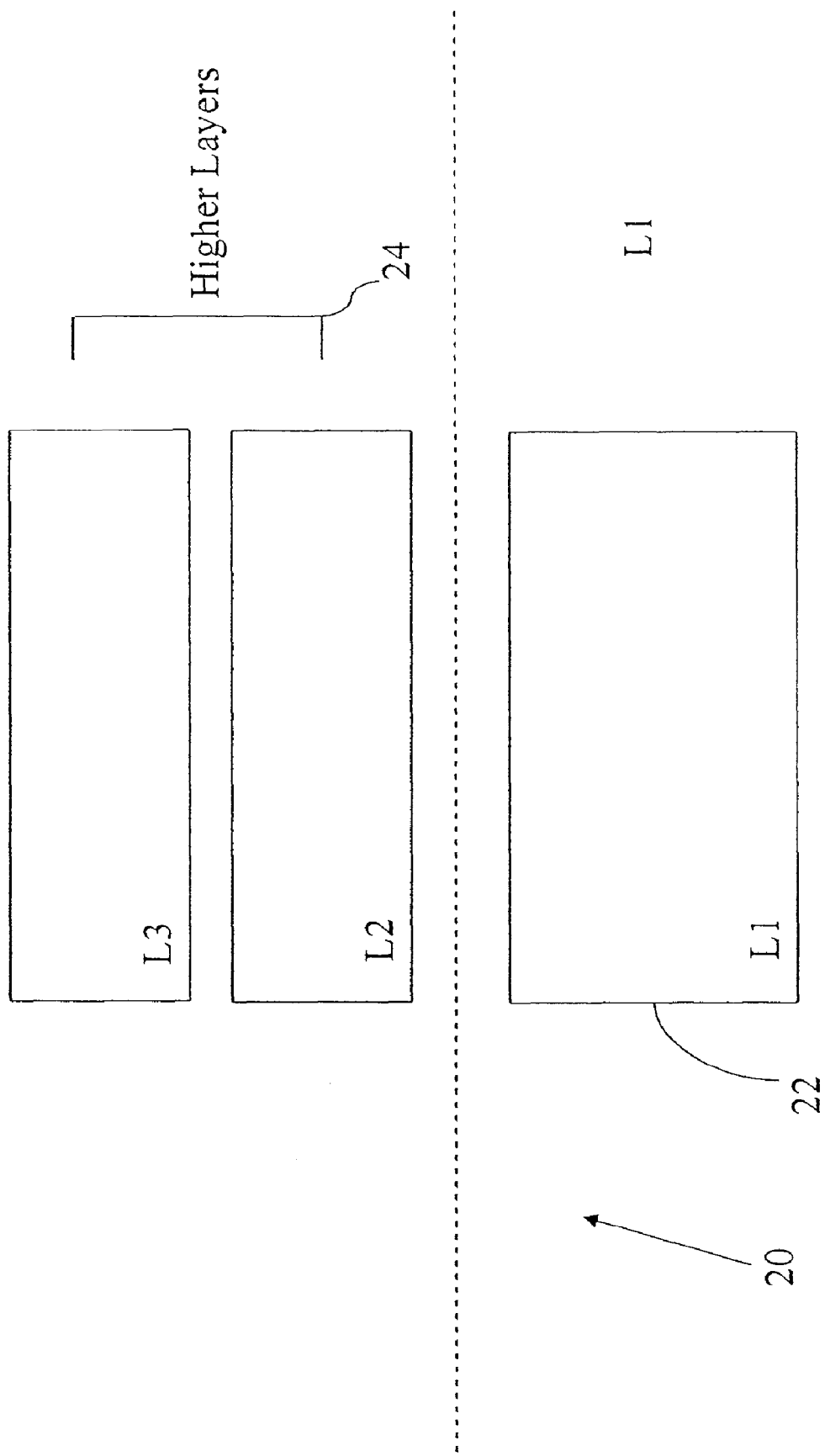
FIG. 2 is a block diagram illustrating a protocol stack layering.

FIG. 2 represents elements of a communication system 20 in terms of a standard radio access protocol stack of logical layers. Different types of operational and data formatting operations are performed at different layers in the stack. The layers are divided in two for simplicity—a lowest physical layer, "L1" 22, which offers information transfer services; and higher layers 24, including "L2" and "L3" with RRC (Radio Resource Control), RLC (Radio Link Control) and MAC (Medium Access Control) layers, for example.

A UE 500 wanting to initiate communication with a UTRAN, needs to send a transmission starting at a certain power level. Messages can be sent using a RACH channel (mapped on to a PRACH (Physical Random Access Channel)) for a UE in Idle or Cell_FACH modes, and/or a CPCH channel (mapped onto a PCPCH (Physical Common Packet Channel)). RACH carries uplink information including CCCH (common control information), DCCH (dedicated control information), and DTCH (dedicated user information); while the CPCH carries information including DTCH (dedicated packet-based user data) and DCCH (dedicated control information). The initial signal is a RACH or CPCH message, or a preamble (a specific, shortened signal) preceding a possible RACH or CPCH transmission.

Figure 3:
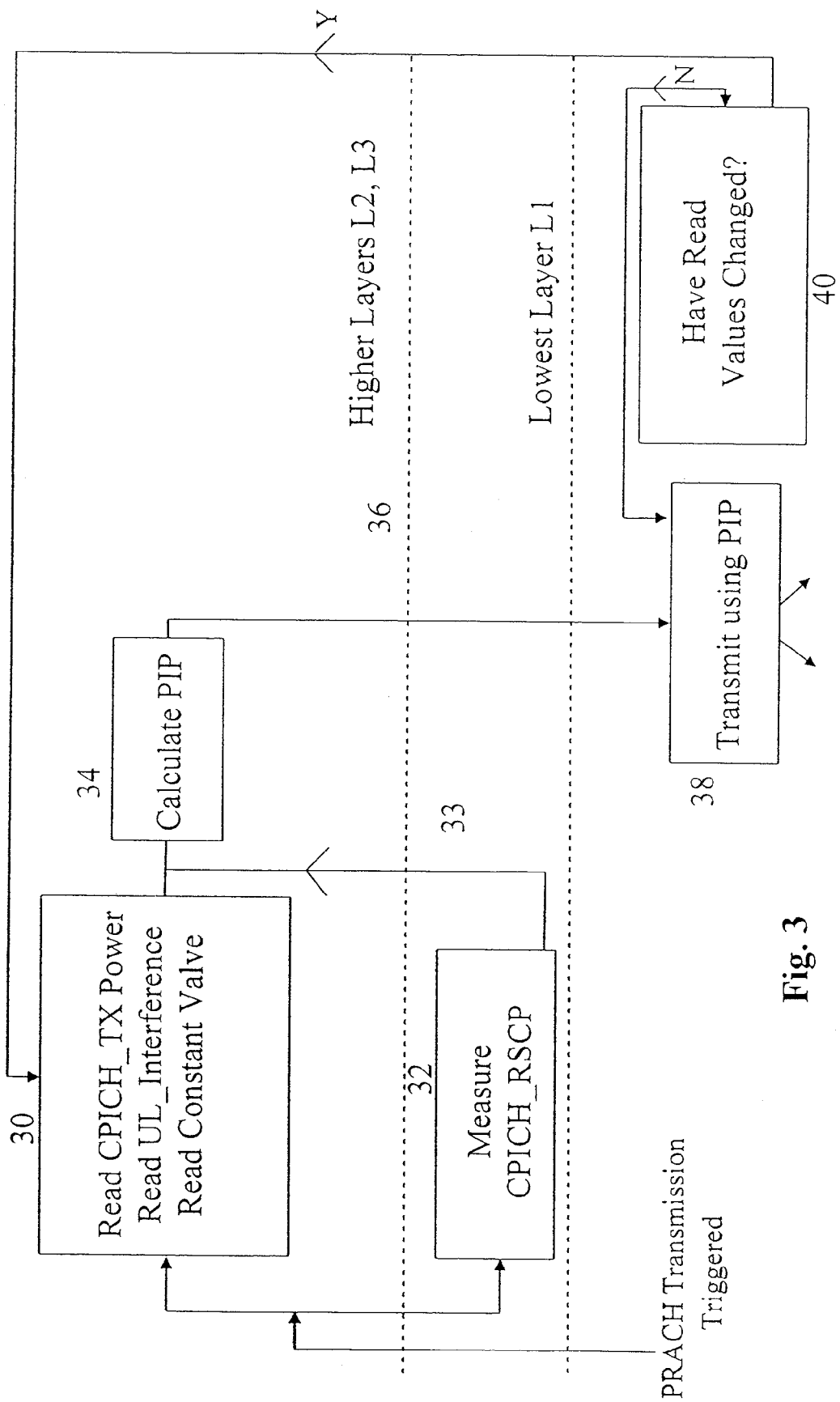
FIG. 3 is a flow diagram illustrating a method for calculating a preamble initial power according to standard 25.331.

The flow diagram of FIG. 3 illustrates an open loop power control method for determining PIP (the initial power for transmission of a preamble), as described in standard 25.331. Prior to PRACH or PCPCH transmission, in step 30 the UE 500 reads IEs CPICH TX power (primary common pilot channel transmission power) and "constant value" (a variable) from a broadcast SIB (system information block) type 5 (or optionally SIB 6), and IE UL interference (uplink interference) from SIB 7.

In step 32, CPICH_RSCP is measured in L1 and then sent to a higher layer, here RRC. In one aspect, CPICH_RSCP is measured repeatedly, and updated value of CPICH_RSCP used in calculation or recalculation of PIP. PIP is then calculated in the higher layer, according to $$PIP = \text{Primary CPICH TX power} - \text{CPICH\_RSCP} + \text{UL interference} + \text{constant value}.$$

The PIP calculated in the higher RRC layer is then submitted to L1 (step 36) for use in transmission. PIP is continually calculated in the higher layer prior to a transmission, or when there is an indication of a change 40 in a broadcast parameter (e.g. a value tag in the MIB has changed), and the new PIP calculated in the higher layers resubmitted to L1 for use. In an alternative (not shown), there may be a change in the value of UL-interference read from SIB7 but the UE may use on old value until SIB7 expires.

Figure 4:
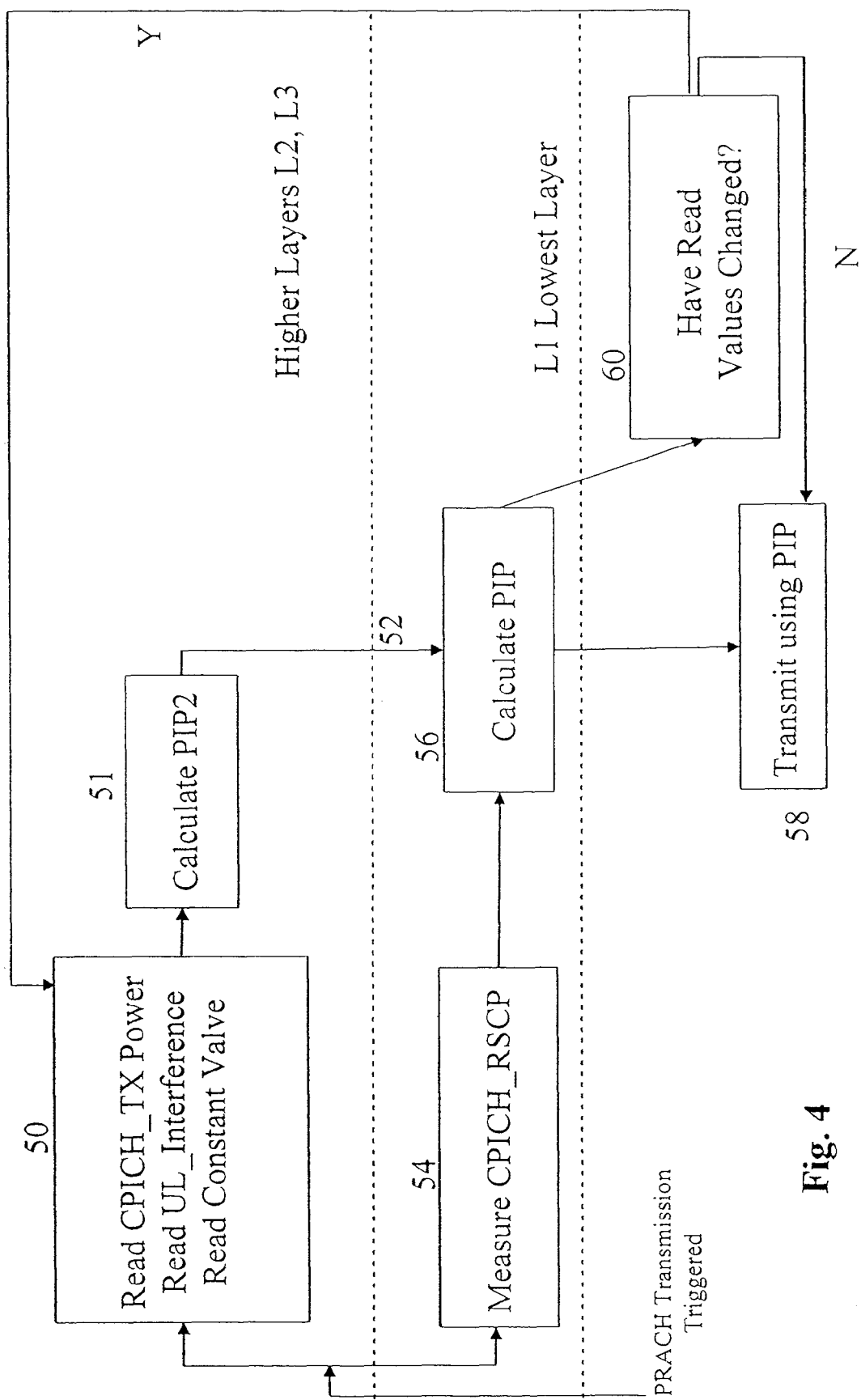
FIG. 4 is a flow diagram illustrating a method for calculating a preamble initial power according to a first embodiment.

The flow diagram of FIG. 4 illustrates the calculation of PIP according to one aspect of the method described herein, prior to a PRACH transmission, with UEs in Idle or Cell_FACH modes in a UMTS-FDD (frequency decision duplex) system.

In step 50, IEs CPICH TX power, UL interference and a constant value are read from broadcast SIBs. A transmission precursor power, PIP2, defined as $$PIP2 = \text{Primary CPICH TX power} + \text{UL interference} + \text{constant value}$$

is then calculated in step 51 in the higher layers (here the RRC) and sent in step 52 to L1. CPICH_RSCP is measured in L1 in step 54 via a receiver (not shown). In step 56, L1 is arranged to calculate PIP from received PIP2 from:

$$PIP = PIP2 - \text{CPICH\_RSCP}.$$

PIP is then used for transmission of the initial communication 58. In step 60, prior to a transmission or if any of the broadcast IEs have changed, then the open loop method is repeated with PIP calculated in L1 again.

According to this method, it is recognised that there is no need to send the measured CPICH_RSCP to the RRC for the calculation of PIP, since it is used in the calculation of PIP in L1. Therefore when for example a broadcast parameter changes, PIP can be recalculated in a way that reduces RRC-L1 signalling. Removing this signalling removes the need to execute a clock cycle to process the signalling, so the protocol stack will be faster and advantageously consume less power.

In a variation (not shown), the received IEs are submitted to L1 and PIP calculated in L1 using the received IEs and CPICH_RSCP measured in L1.

In a further variation, for FDD (not shown), when establishing a first DPCCH (Dedicated Physical Control Channel) communication (for cells in cell_DCH), an initial power level DPCCH_Initial_power (DIP) for open loop power control is described in 8.5.3 of the 25.331 Standard by the calculation:

DIP=DPCCH_Power_Offset−CPICH_RSCP, where DPCCH_Power_Offset has the value of a broadcast IE "uplink DPCH power control info", and the value of CPICH_RSCP is again measured in L1.

According to this variation, analogous to PIP2, precursor DIP2 is defined as DIP2=DPCCH_Power_Offset, and is sent to L1. L1 is then arranged to calculate DIP using received DIP2 from DIP=DIP2−CPICH_RSCP. So as for PIP calculation, there is no need to send measured CPICH_RSCP to RRC for the calculation of DIP, since it is used in the calculation of DIP in L1.

In a further embodiment, changes in PIP are recalculated as described when CPICH_RSCP changes.

Figure 5:
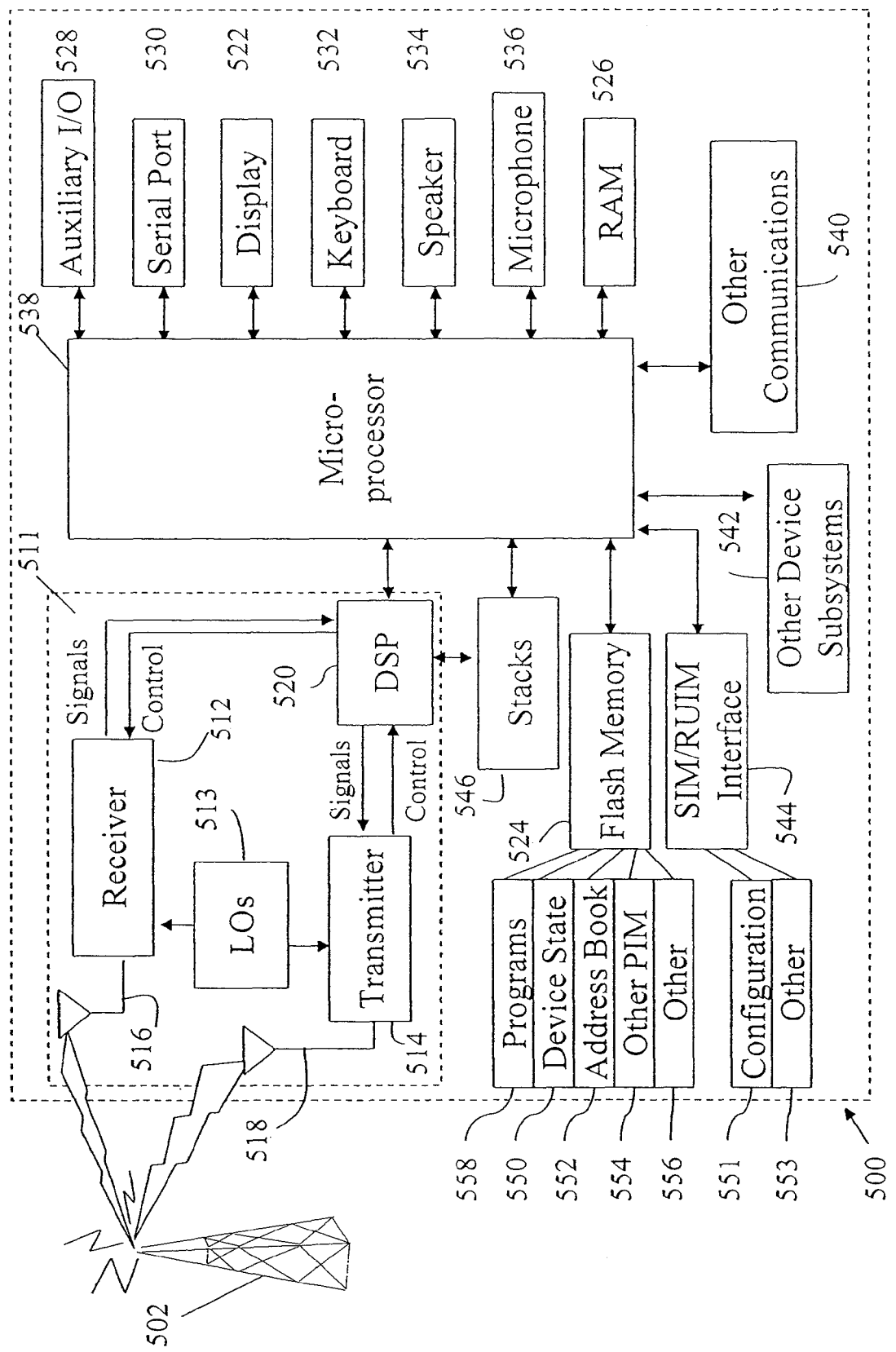
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 500 is preferably a two-way wireless communication device having at least voice and data communication capabilities. Mobile station 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate. For example, mobile station 500 may include a communication subsystem 511 designed to operate within the Mobitex™ mobile communication system, the DataTAC™ mobile communication system, GPRS network, UMTS network, or EDGE network.

Network access requirements will also vary depending upon the type of network 502. For example, in the Mobitex and DataTAC networks, mobile station 500 is registered on the network using a unique identification number associated with each mobile station. In UMTS and GPRS networks, however, network access is associated with a subscriber or user of mobile station 500. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 500 will be unable to carry out any other functions involving communications over the network 502. The SIM interface 544 is normally similar to a card-slot into which a SIM card can be inserted and ejected like a diskette or PCMCIA card. The SIM card can have approximately 64K of memory and hold many key configuration 551, and other information 553 such as identification, and subscriber related information.

When required network registration or activation procedures have been completed, mobile station 500 may send and receive communication signals over the network 502. Signals received by antenna 516 through communication network 502 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 502 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile station 500 preferably includes a microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, preferably enables execution of software applications on the mobile station. A predetermined set of applications that control basic operations, including at least data and voice communication applications for example, will normally be installed on mobile station 500 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 502. In a preferred embodiment, the PIM data items are seamlessly integrated, synchronized and updated, via the wireless network 502, with the mobile station user's corresponding data items stored or associated with a host computer system. Further applications may also be loaded onto the mobile station 500 through the network 502, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile station 500.

In a data communication mode, a received signal such as a text message or web page download will be processed by the communication subsystem 511 and input to the microprocessor 538, which preferably further processes the received signal for output to the display 522, or alternatively to an auxiliary I/O device 528. A user of mobile station 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile station 500 is similar, except that received signals would preferably be output to a speaker 534 and signals for transmission would be generated by a microphone 536. Alternative voice or audio I/O subsystems, such as a voice message recording subsystem, may also be implemented on mobile station 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5, would normally be implemented in a personal digital assistant (PDA)-type mobile station for which synchronization with a user's desktop computer (not shown) may be desirable, but is an optional device component. Such a port 530 would enable a user to set preferences through an external device or software application and would extend the capabilities of mobile station 500 by providing for information or software downloads to mobile station 500 other than through a wireless communication network. The alternate download path may for example be used to load an encryption key onto the device through a direct and thus reliable and trusted connection to thereby enable secure device communication.

Other communications subsystems 540, such as a short-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

When mobile device 500 is used as a UE, protocol stacks 546 include apparatus and a method for calculating an initial transmission power in universal mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of some of the steps may be immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be used together with other claimed features.

It is further noted that where a method has been described with particular reference to random access procedure, this is for illustrative purposes, and the invention is not limited in its applicability to random access. It is also noted that although described in the context of a UMTS-FDD, the invention can be applied to other protocol standards.

What is claimed is:

1. A method for calculating a transmission power in a user equipment configured for use in a mobile telecommunications system, said user equipment comprising a protocol stack including a lower physical layer L1, the method comprising:
  at a logical layer higher than L1,
    calculating a first power value by the user equipment;
    submitting said first power value to the lower physical layer L1; and
  in the lower physical layer L1,
    calculating the transmission power from said first power value.

2. The method of claim 1, wherein the transmission power is an initial transmission power.

3. A user equipment for use in a mobile communications system comprising a network of a plurality of cells, the user equipment being configured to implement the method of claim 2.

4. The method of claim 1, further comprising:
  receiving broadcast system information; and
  measuring a received signal power, and wherein the transmission power is calculated also from said broadcast system information and said measured signal power.

5. The method of claim 4, wherein said broadcast system information is processed at a logical layer higher than L1 before the transmission power is calculated.

6. A user equipment for use in a mobile communications system comprising a network of a plurality of cells, the user equipment being configured to implement the method of claim 4.

7. A user equipment for use in a mobile communications system comprising a network of a plurality of cells, the user equipment being configured to implement the method of claim 1.

8. A user equipment for use in a mobile telecommunications system, said user equipment comprising a protocol stack including a lower physical layer L1, the user equipment configured to:

at a logical layer higher than L1, calculate a first power value and submit said first power value to the lower physical layer L1; and in the lower physical layer L1, calculate the transmission power from said first power value.

9. The user equipment of claim 8, wherein the transmission power is an initial transmission power.

10. The user equipment of claim 8, further configured to:

receive broadcast system information;

measure a received signal power; and wherein the transmission power is calculated also from the broadcast system information and the measured signal power.

11. A non-transistory computer readable medium having instructions for causing a processor to execute a method for calculating a transmission power for a user equipment having a protocol stack including a lower physical layer L1, the method comprising:

calculating, at a logical layer higher than L1, a first power value and submit said first power value to the lower physical layer L1; and calculating, in the lower physical layer L1, the transmission power from said first power value.

12. The computer-readable medium of claim 11, wherein the transmission power is an initial transmission power.

13. The computer-readable medium of claim 11, having additional instructions for causing the processor to execute the method further comprising:

receiving broadcast system information; and measuring a received signal power, wherein the transmission power is calculated also from the broadcast system information and the measured signal power.

14. A user equipment for use in a mobile telecommunications system, wherein said user equipment comprises a protocol stack including a lower physical layer L1, the user equipment comprising :

means for calculating, at a logical layer higher than L1, a first power value and submit said first power value to the lower physical layer L1; and means for calculating, in the lower physical layer L1, the transmission power from said first power value.

\* \* \* \* \*